April 18, 1961 R. A. KENNEDY 2,979,958
TIRE AND WHEEL IMBALANCE CALCULATOR
Filed Sept. 16, 1958 3 Sheets-Sheet 1

INVENTOR
RAYMOND A. KENNEDY
BY
Kimmel & Crowell
ATTORNEYS

April 18, 1961 R. A. KENNEDY 2,979,958
TIRE AND WHEEL IMBALANCE CALCULATOR
Filed Sept. 16, 1958 3 Sheets-Sheet 2

INVENTOR
RAYMOND A. KENNEDY
BY Kimmel & Crowell
ATTORNEYS

April 18, 1961 R. A. KENNEDY 2,979,958
TIRE AND WHEEL IMBALANCE CALCULATOR
Filed Sept. 16, 1958 3 Sheets-Sheet 3
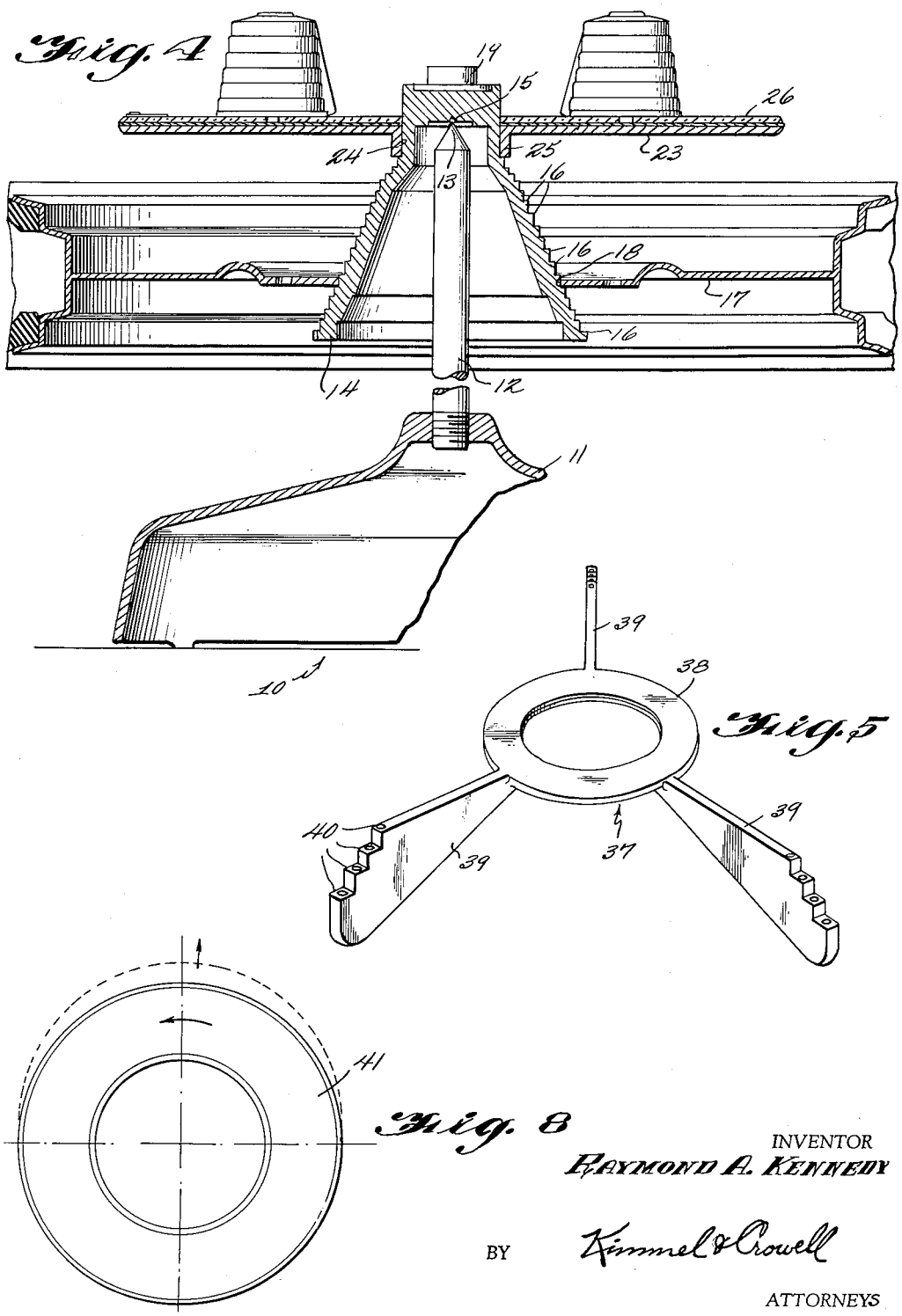
INVENTOR
RAYMOND A. KENNEDY
BY Kimmel & Crowell
ATTORNEYS

United States Patent Office 2,979,958
Patented Apr. 18, 1961

2,979,958

TIRE AND WHEEL IMBALANCE CALCULATOR

Raymond A. Kennedy, 3516 Stone Park Blvd.,
Sioux City, Iowa

Filed Sept. 16, 1958, Ser. No. 761,432

3 Claims. (Cl. 73—483)

The present invention relates to a tire and wheel imbalance calculator and is a continuation-in-part of my now abandoned application, Serial No. 505,860, filed May 4, 1955, entitled Static and Dynamic Wheel Balance Calculator.

The primary object of the invention is to provide an apparatus for calculating the imbalance of vehicle tire and wheels so that weights may be applied to the wheels and tires to overcome the effects of the imbalance.

Another object of the invention is to provide a calculator of the class described above having means thereon for supporting unmounted tires and tubes to permit the calculation of the imbalance thereof before mounting on a balanced wheel.

A further object of the invention is to provide a calculator, as described above, in which direct reading indicators are associated with calibrated scales to provide corrective weight indications for application to the tires and wheels to overcome the effects of imbalance therein.

A still further object of the invention is to provide an imbalance calculator of the class described above which calculates the static imbalance by directly indicating the weight required to counteract the effects of the imbalance.

Other objects and advantages will become apparent in the following specification when considered in light of the attached drawings in which:

Figure 4 is an enlarged fragmentary vertical cross section of the structure illustrated in Figure 1, illustrating a wheel and tire mounted thereon.

Figure 5 is a perspective view of the tire and tube support ring.

Figure 8 is a side elevation of a tire and wheel illustrating diagrammatically the effect of static imbalance forces thereon when in motion.

Figure 1:
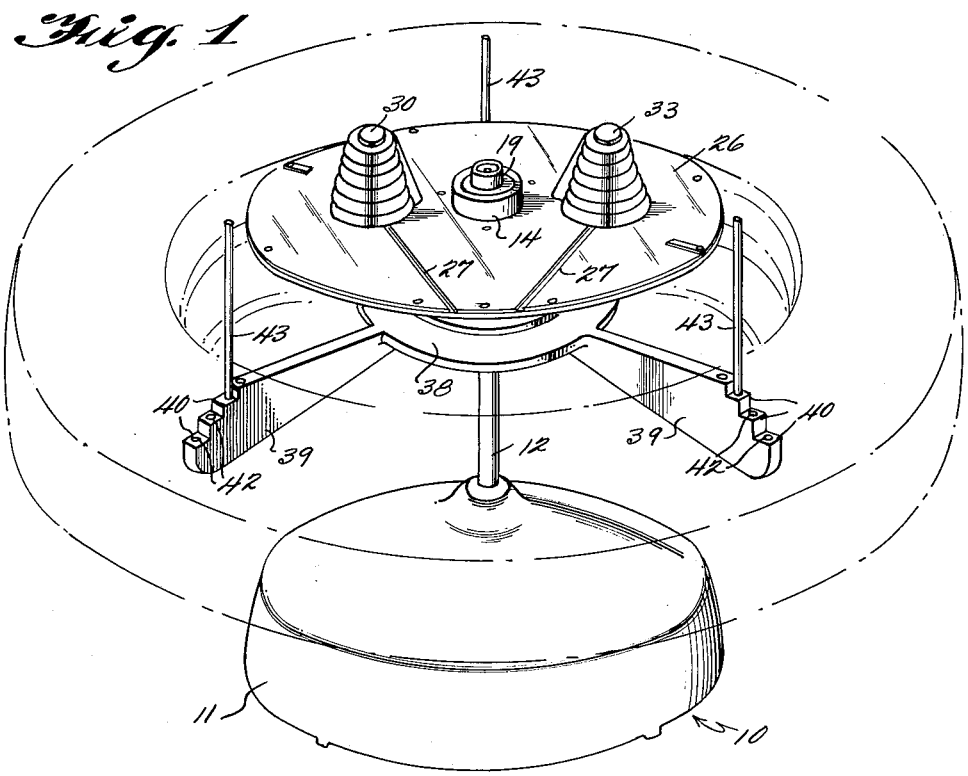
Figure 1 is a perspective view of the invention.

Referring now to the drawings in detail wherein like reference characters indicate like parts throughout the several figures, the reference numeral 10 indicates generally a tire imbalance calculator constructed in accordance with the invention.

The tire imbalance calculator 10 includes a base 11 for engagement with the ground and having a shaft 12 threaded therein to extend upright therefrom. The shaft 12 is tapered to a point 13 at its upper end and a hollow conical wheel support 14 is provided with an internal socket 15 supported thereon. The hollow conical wheel support 14 is provided with a plurality of step shoulders 16 arranged in upwardly circumference-decreasing relation to form a series of wheel support rings upon which conventional motor vehicle wheels 17 may engage with their axle bores 18 encompassing the wheel support 14.

The step shoulders 16 provide means whereby all standard axle bores 18 of wheels 17 may be snugly supported on the wheel support 14.

A circular spirit level 19 is provided with a bubble 20 positioned beneath a cover glass 21 on which is inscribed a central indicator ring 22 within which the bubble 20 is positioned to indicate that the wheel support 14 is perfectly level.

Figure 2:
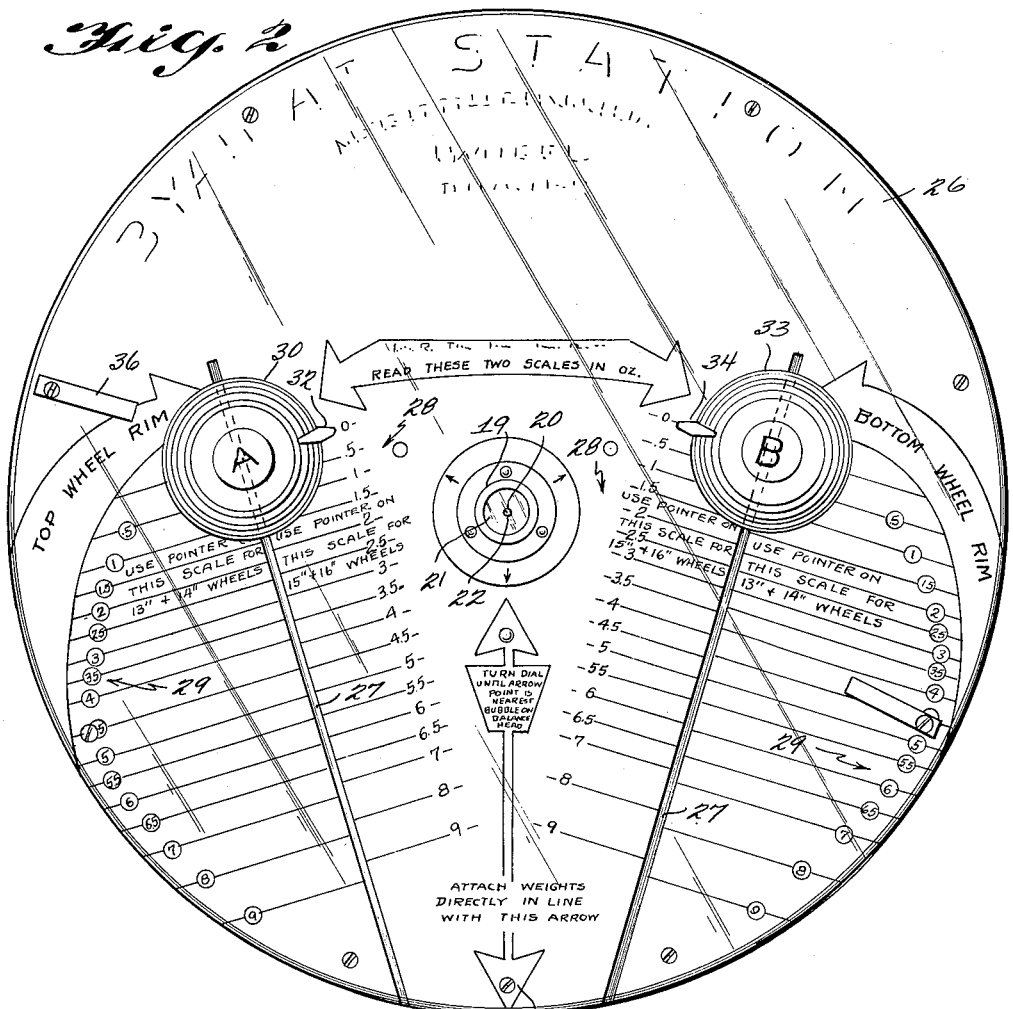
Figure 2 is a top plan view of the calculator dial used with the invention.
Figures 6, 7:
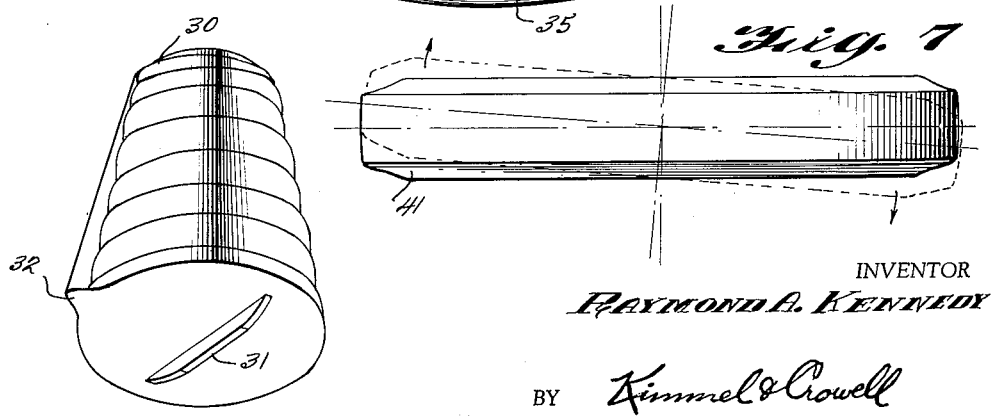
Figure 6 is a perspective view of one of the calculator weights removed from the calculator dial.
Figure 7 is a side elevation of a tire and wheel illustrating diagrammatically the action of imbalance forces thereon.

A calculator disk 23 is provided with a central bore 24 of the same size as the upper cylindrical portion of the wheel support 14 and is provided with a downwardly extending annular collar 25 which engages the uppermost of the step shoulders 16 to prevent the disk 23 from tilting with respect to the wheel support 14. The calculator disk 23 has a plastic disk 26 secured to the upper face thereof and provided with a pair of angularly related outwardly converging grooves 27. The grooves 27 are equispaced on opposite sides of the center of the calculator disk 23, as best seen in Figure 2.

The plastic disk 26 is provided with a pair of identical scales, indicated generally at 28, which are arranged along the grooves 27 on the inner sides thereof and are calibrated in ounces of weight. A second pair of scales 29 are arranged adjacent to the grooves 27 along the outer edges thereof and are also calibrated in ounces of weight. It should be noted that the scales 28 differ from the scales 29, for reasons to be assigned.

A weight 30 is provided with a rib 31 on the lower face thereof for engagement in one of the grooves 27 and the weight 30 is adapted to be moved along the groove 27 with an indicator point 32 formed integrally thereon cooperating with one of the scales 28, 29, depending on the calculation to be made. A weight 33, identical to the weight 30, is slidably arranged on the plastic disk 26 engaging in the other groove 27, and having an integral pointer 34 thereof cooperating with one of the scales 28, 29, depending upon the calculation to be made.

The plastic disk 26 is provided with an indicating arrow, 35 to indicate the light point of the tested wheel or tire and the point thereon to which the compensating weights are to be attached.

The calculator disk 23 is provided with a pair of oppositely disposed handle members 36 to lift the calculator disk 23 when surrounded by a tire and wheel too small to permit the fingers to engage the edges of the disk 23.

Figure 3:
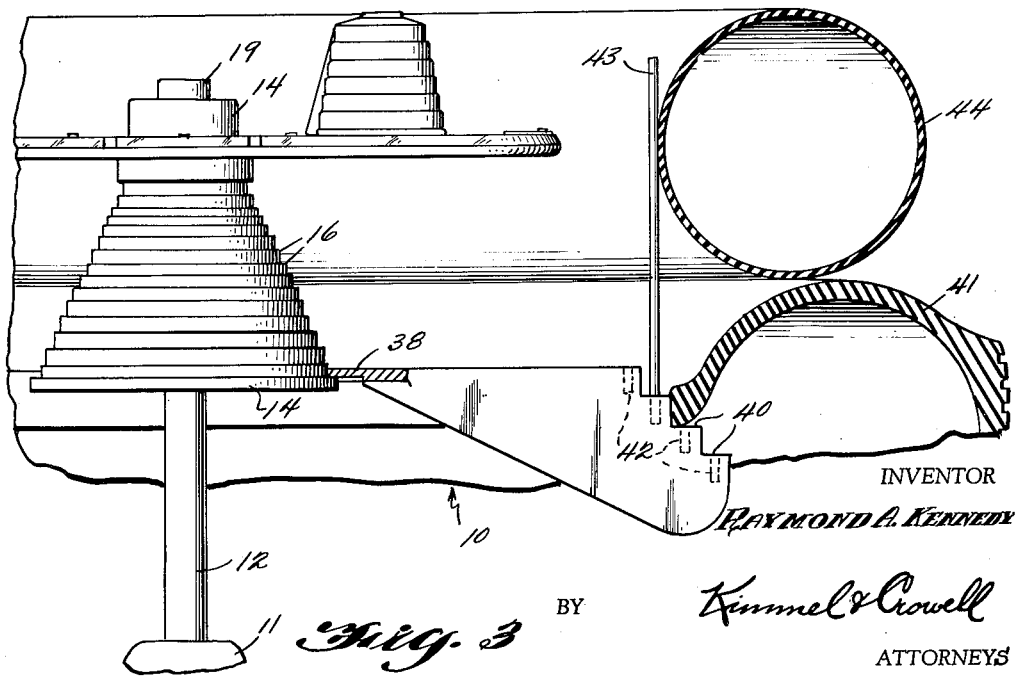
Figure 3 is an enlarged fragmentary vertical cross section of the structure illustrated in Figure 1, illustrating a tire and inner tube mounted thereon.

In Figures 1, 3 and 5 an adaptor 37 is indicated generally for adapting the wheel support 14 to support tires and tubes not yet mounted on a wheel. The adaptor 37 has a central ring 38 which is arranged to be supported on one of the shoulders 16 and has a plurality of radially extending arms 39 secured thereto. The arms 39 have their outer ends provided with step notches 40 to provide step supports for the beads of tires of varying rim sizes. A tire 41 may be engaged in any one of the shoulders 40 depending upon its rim size and each arm 39 will be engaged with the tire 41, supporting it in level condition with relation to the wheel support 14. Each shoulder 40 on the arms 39 has an upright socket 42 formed therein to receive an upright inner tube aligning shaft 43 therein. The inner tube aligning shaft 43 extends above the tire 41 to permit an inner tube 44 to rest on the tire 41 in axial alignment therewith. With this arrangement, the tire 41 and tube 44 may have their imbalance precalculated before being mounted on a wheel to determine if their imbalance is within counteractable limits.

In the use and operation of the apparatus illustrated in Figures 1 through 6, a wheel 17 is supported on one of the step shoulders 16 so that the bore 18 can snugly fit the wheel support 14, as seen in Figure 4. The calculator disk 23 is then placed on the upper end of the wheel support 14 and then by observing the bubble 20 the disk 23 is turned with respect to the wheel 17 so that the arrow 35 indicates a point on the wheel 17 diametrically opposed to the heaviest point thereon. The weights 30 and 33 are then placed on the calculating disk 23 with the ribs 31 engaged in the grooves 27. The pointers 32, 34 are both directed to the scales 28, or both are directed toward the scales 29, depending upon the size of the wheel and tire unit being tested. The weights 30, 33 are then moved outwardly in the grooves 27 toward the peripheral edge of the disk 23. The weights 30 and 33 are moved equally in the grooves 27 until the bubble 20 is centered in the indicator ring 22 of the level 19. When the weights 30, 33 have balanced the wheel 17 and the bubble 20 has been centered in the indicator ring 22, the pointers 32, 34 will indicate the total quantity of weight required to be placed on each side of the wheel rim to counteract the static imbalance forces created when the wheel is in motion.

Should an uneven movement of the weights 30, 33 in the grooves 27 be required to center the bubble 20 in the indicator ring 22, it is evident that the disk 23 has not had the arrow 35 set to the correct position. In such an instance the disk 23 should be moved to correct the position of the arrow 35.

In pneumatic tires of present day high speed vehicles, a heavy point on the tire in the area of the tread is counterbalanced by placing an appropriate weight on the rim of the wheel at a diametrically opposed position. At relatively slow speeds a weight so positioned on a round tire is effective in counteracting the effects of the heavy point in the round tire, but at slow speeds the effects of a heavy point in a round tire are relatively slight and do not interfere with normal driving. As the speed of the wheel increases, centrifugal forces tend to move the heavy point in the tire outwardly away from center. The resiliency of the pneumatic tire provides a sufficient amount of stretch so that the centrifugal forces actually move the heavy point out from center as shown by the dotted line in Fig. 8 and immediately the effect of the weight becomes magnified due to the lengthened moment arm relating the heavy point to the center of the wheel. With the present invention, applicant has provided an apparatus for accurately calculating the imbalance in the tire and by means of calibrated scales, has indicated the necessary excess or over balanced weight required to be added to the wheel rim to counteract the forces encountered when the tire is moving at high speed.

The scales 28 have been calibrated for use with 15 and 16 inch wheels, while the scales 29 have been calibrated for use with 13 and 14 inch wheels. Obviously, additional scales may be provided for calculating the imbalance in tires of different diameters and for tires of varying degrees of elasticity.

The apparatus described in the present invention comprises a device to determine the amount of static imbalance in a pneumatic tire and to calculate the required weight to be added to the wheel to overcome the effects of the static imbalance when the tire is driven at high speeds, including the necessary overbalancing weight.

Having thus described the preferred embodiments of the invention, it should be understood that numerous structural modifications and adaptations, as well as modifications in the method, may be resorted to without departing from the scope of the appended claims.

What is claimed is:

1. A calculator for indicating the required overbalanced weights to be added to a stationary wheel to compensate for imbalance at high speeds comprising a wheel support, means mounting said wheel support so that it may be readily tilted, a circular spirit level mounted on said wheel support, a disk positioned on said wheel support, said disk having a pair of radially outwardly converging slots formed in the upper face thereof with calibrated weight indicating scales extending along each of said slots, a pair of weights slidably mounted on said disk, a rib integrally formed on each of said weights engaging in one of said slots for guiding said weights along said slots and a scale pointer fixed to each of said weights for selective cooperative relation with the calibrated scales along said slots, the indicia of said scales being so positioned that when the balancing weights are located so as to effect the balance of the wheel support and the test article supported thereon, the said scale pointers will indicate the size of the overbalance weight necessary to be added to the wheel to compensate for imbalance at high speeds.

2. A device as claimed in claim 1 wherein means are provided detachably mounted on said wheel support for engaging and supporting an unmounted tire thereon.

3. A device as claimed in claim 2 in which a plurality of tube aligning standards are detachably supported on said last named means in upwardly extending relation for aligning a tube with a tire supported on said last named means.

References Cited in the file of this patent

UNITED STATES PATENTS

| | | |
|---|---|---|
| 2,176,269 | Morse | Oct. 17, 1939 |
| 2,270,657 | Kraft | Jan. 20, 1942 |
| 2,462,266 | Howard | Feb. 22, 1949 |
| 2,613,533 | Jones | Oct. 14, 1952 |

FOREIGN PATENTS

| | | |
|---|---|---|
| 570,499 | Great Britain | July 10, 1945 |